United States Patent [19]

Miyake

[11] Patent Number: 4,933,854
[45] Date of Patent: Jun. 12, 1990

[54] ANTI-LOCK CONTROL SYSTEM FOR MOTOR VEHICLES

[75] Inventor: Katsuya Miyake, Ageo, Japan

[73] Assignee: Akebono Brake Industry Co., Ltd., Tokyo, Japan

[21] Appl. No.: 257,846

[22] Filed: Oct. 14, 1988

[30] Foreign Application Priority Data

Oct. 16, 1987 [JP] Japan .................. 62-259485

[51] Int. Cl.⁵ ............................... B60T 8/32
[52] U.S. Cl. .................. 364/426.02; 303/111; 303/95
[58] Field of Search ............ 364/426.02, 424.05; 303/111, 95, 96

[56] References Cited
U.S. PATENT DOCUMENTS

| | | |
|---|---|---|
| 4,320,459 | 3/1982 | Lindemann et al. ........... 364/426.02 |
| 4,374,421 | 2/1983 | Leiber ........................... 364/426.02 |
| 4,418,966 | 12/1983 | Hattwig ............................. 303/100 |
| 4,460,963 | 7/1984 | Leiber et al. ......................... 364/426 |
| 4,489,382 | 12/1984 | Jonner et al. ....................... 364/426 |
| 4,547,022 | 10/1985 | Brearley et al. .................... 303/6 C |
| 4,592,599 | 6/1986 | Belart ................................. 303/119 |
| 4,652,060 | 3/1987 | Miyake ................................ 303/96 |
| 4,717,209 | 1/1988 | Hagiya et al. ....................... 303/111 |
| 4,733,921 | 3/1988 | Farr .................................... 303/111 |

Primary Examiner—Thomas G. Black

[57] ABSTRACT

An anti-lock control system for motor vehicles is provided which is arranged so that at the first cycle of anti-lock control operation, respective brake channels are controlled at the same time and in the same manner instead of independently while at the second and subsequent cycles of the anti-lock control operation, the respective brake channels are controlled independently.

3 Claims, 5 Drawing Sheets

ANTI-LOCK CONTROL SYSTEM FOR MOTOR VEHICLES

BACKGROUND OF THE INVENTION

1. Field of the Invention

This invention relates to a novel and improved anti-lock control system for motor vehicles, which is operative to prevent the wheels of the motor vehicle from being locked during braking operation of the motor vehicle.

2. Description of the Prior Art

Generally, with an anti-lock control system for motor vehicles, anti-lock control is effected by means of microcomputers such that hold valves and decay vaLves comprising electromagnetic valves are opened and closed on the basis of electrical signals representing wheel speeds sensed by wheel speed sensors, thereby increasing, holding or reducing the brake hydraulic pressure, for the purpose of securing improved steering performance and running stability of the motor vehicle, while at the same time shortening the braking distance.

FIG. 1 of the accompanying drawings illustrate, by way of example, manners in which wheel speed $V_w$, wheel acceleration and deceleration $+V_w$ and $-V_w$, and brake hydraulic pressure $P_w$ are varied during the operation of the conventional anti-lock control system, together with hold signal HS and decay signal DS for opening and closing hold valves and decay valves, as disclosed in U.S. Pat. No. 4,741,580.

When the brake equipment of the motor vehicle is not being operated while the motor vehicle is running, the hold valves remain open while the decay valves remain closed, the brake hydraulic pressure $P_w$ is not increased; and when the brake equipment is operated, the brake hydraulic pressure $P_w$ is rapidly increased at time $t_0$ so that the wheel speed $V_w$ is decreasd (normal mode). A reference wheel speed $V_t$ is set up which is lower by a predetermined amount $\Delta V$ than the wheel speed $V_w$ and follows the latter with such a speed difference. More specifically, reference wheel speed $V_T$ is set up so that when the deceleration (negative acceleration) $-V_w$ of the wheel reaches a predetermined threshold level, say $-1.0$ G at time $t_1$, anti-lock control is started, and the reference wheel speed $V_T$ is thereafter made to linearly decrease with a deceleration gradient $\theta$ ($=-1.0$ G). At time $t_2$ when the deceleration $-V_w$ of the wheel reaches a predetermined maximum value $-G_{max}$, the hold signal HS is generated so that the hold valves are closed, thus holding the brake hydraulic pressure $P_w$.

With the brake hydraulic pressure $P_w$ being held, the wheel speed $V_w$ is further decreased. At time $t_3$, the wheel speed $V_w$ and the reference wheel speed $V_T$ become equal to each other, and a first cycle of anti-lock control is started; and the decay signal DS is generated, by which the decay valves are opened so that reduction of the brake hydraulic pressure $P_w$ is started. As a result of this reduction of the brake hydraulic pressure $P_w$, the wheel speed $V_w$ is changed from increasing to dcreasing at time 14 when a low peak VL of the wheel speed $V_w$ occurs. Either at the time $t_4$ or at time $t_5$ when the wheel speed $V_w$ is increased up to the level of a speed Vb that is higher than the low peak speed VL by 10% of the difference Y between wheel speed Va occurring at the time $t_3$ when the reduction of the brake hydraulic pressure was started and the low peak speed VL, i.e., $Vb=VL+0.1Y$, the decay signal DS is interrupted (FIG. 1 shows the case where the decay signal DS is interrupted at the time $t_5$), and as a result the decay valves are closed so that the reduction of the brake hydraulic pressure $P_w$ is stopped and thus the brake hydraulic pressure is held. The wheel speed $V_w$ is further increased up the level of a speed Vc that is higher than the low peak speed VL by 90% of the difference Y between the wheel speed Va occurring at the time $t_3$ when the reduction of the brake hydraulic pressure $P_w$ was started and the low peak speed VL, i. e., $Vc=VL+0.9Y$. Subsequently, at time $t_7$, a high peak VH of the wheel speed VW is reached; thereupon, the brake hydraulic pressure $P_w$ is again increased. In this case, the buildup of the brake hydraulic pressure $P_w$ is effected in such a manner that the brake hydraulic pressure $P_w$ is alternately increased and held in succession by the fact that the hold signal HS is turned on and off mincingly, or with relatively short intervals so that the brake hydraulic pressure $P_w$ is caused to gradually build up. In this way, the wheel speed $V_w$ is decreasd, and at time $t_8$ (corresponding to the time $t_3$), a second cycle of the mode for reduction of the brake hydraulic pressure occurs. The time period Tx of the initial brake hydraulic pressure buildup occurring at the time $t_7$ is determined on the basis of calculation of the average acceleration $(Vc-Vb)/\Delta T$ over the time interval $\Delta T$ between the time $t_5$ and the time $t_6$ (the average acceleration depends on the friction coefficient $\mu$ of the road surface), and the time period ofthe subsequent pressure holding or pressure buildup is determined on the basis of the acceleration or deceleration of the wheel which is detected immediately prior to the pressure holding or pressure buildup. The brake hydraulic pressure increasing, holding and reducing modes are effected in combination as mentioned above, and thus the wheel speed $V_w$ can be controlled so that the vehicle speed can be decreased, while the wheels of the motor vehicle are prevented from being locked.

Referring to FIG. 2, there is shown a conventional X-type two-channel brake apparatus wherein the righthand front wheel and lefthand rear wheel are controlled through a first oil hydraulic piping channel Q1 common thereto while the lefthand front wheel and righthand rear wheel are controlled through a second oil hydraulic piping channel Q2 common thereto (two-channel control system). In an attempt to apply the above-described anti-lock control system to a motor vehicle which is commonly of the front-engine, front-drive (FF) type and incorporates such an X-type two-channel brake apparatus as shown in FIG. 2, it has heretofore been the practice that anti-lock control with respect to the respective oil hydraulic piping channels Q1 and Q2 is effected through independent control channels respectively(two-channel control). In such a case, with a two-sensor, two-channel type system wherein two speed sensors are provided in association with the lefthand and righthand front wheels respectively, the lefthand and righthand front wheel speeds are regarded as the speeds of the wheels belonging to the respective channels (referred to as channel speeds Vs1 and Vs2 hereinafter), and anti-lock control with respect to the respective channels is effected on the basis of the channel speeds Vs1 and Vs2. With a four-sensor, two-channel type system wherein four speed sensors are provided in association with all the four wheels respectively, anti-lock control with respect to the respective channels is effected on the basis of a first channel speed Vs1 which is the lower one of the righthand front wheel speed and higher one of the righthand and lefthand rear wheel speeds and a second channel speed Vs2 which is the lower one of the lefthand front wheel speed and the selected higher rear wheel speed.

In the arrangement shown in FIG. 2, pressure control valves PCV1 and PCV2 are provided at the rear-wheel side sections of the oil hydraulic channels Q1 and Q2 respectively in such a manner that in the course of brake oil pressure buildup, the proportion of the braking force imparted to the rear wheels is made to be lower than the proportion of the braking force applied to the front wheels. In FIG. 2, where are also provided a master cylinder MC, and a modulator MOD including the hold valves and decay valves associated with the respective channels.

With the two-channel anti-lock control system as mentioned above, if quick braking is applied when the motor vehicle is running on a road surface which represents remarkably different friction coefficients (so-called "split friction ($\mu$)" road surface), then a significant torque unbalance tends to occur between the lefthand and righthand wheels at the first cycle of the anti-lock control so that a great yawing moment tends to occur at the beginning of the anti-lock control, thus resulting in an unstable behavior of the motor vehicle.

SUMMARY OF THE INVENTION

Accordingly, it is an object of the present invention to provide an anti-lock control system which is arranged to prevent a great yawing moment from being caused to occur at the beginning of anti-lock control as in the above-mentioned prior-art arrangement.

Briefly stated, according to the present invention, there is provided an anti-lock control system which is arranged so that at the first cycle of anti-lock control operation, respective brake systems are controlled at the same time and under the same condition instead of independently while at the second and subsequent cycles of the anti-lock control operation, the respective brake systems are controlled independently. With such an arrangement, it is possible to restrain occurrence of yawing moment due to rapid buildup of brake oil pressure; and at the second and subsequent cycles of the anti-lock control operation, the brake oil pressure is permitted to buildup with a controlled gradient so that the yawing moment is increased gradually and thus can easily be coped with through manipulation of the steering wheel by the driver.

Other objects, features and advantages of the present invention will become apparent from the ensuing description taken in conjunction with the accompanying drawings.

DESCRIPTION OF THE PREFERRED EMBODIMENTS

Figure 3:
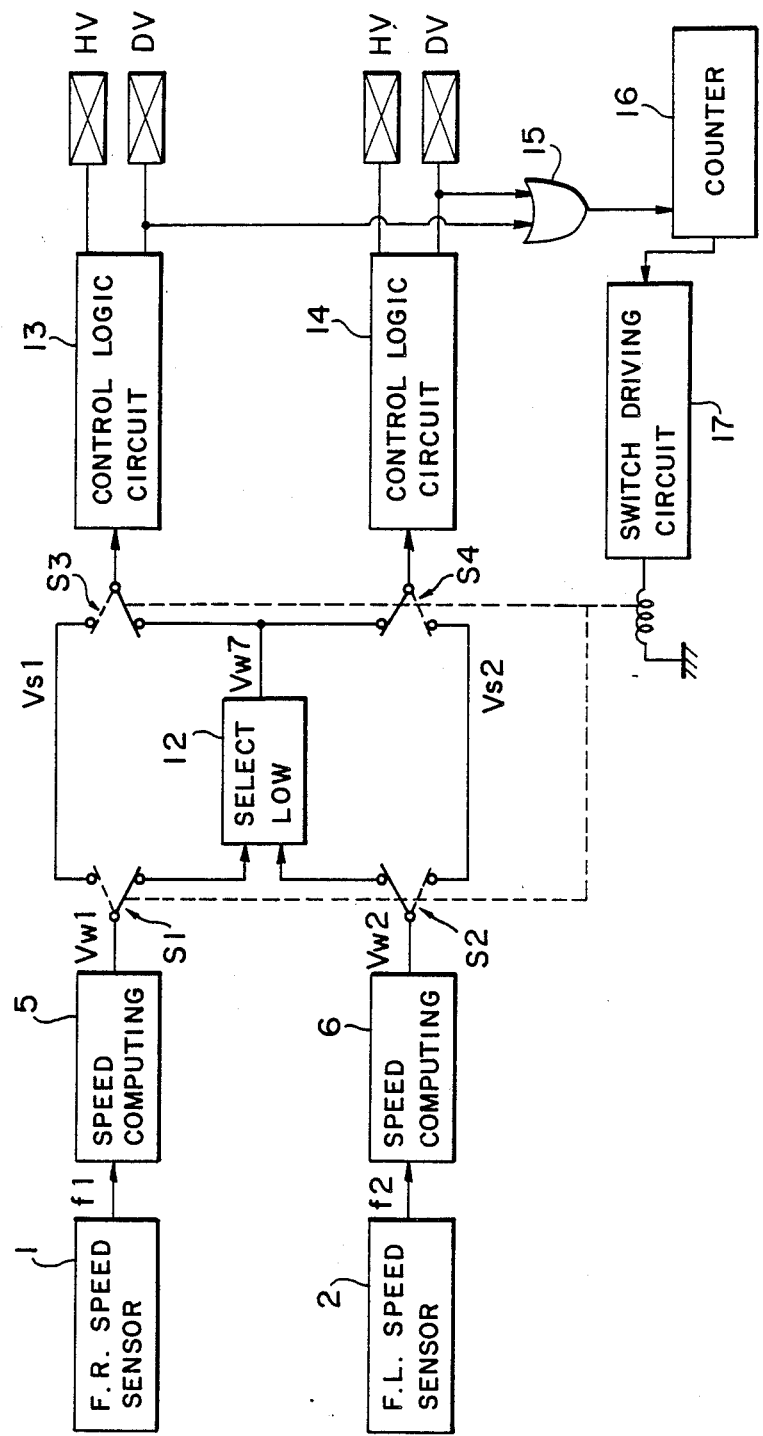
FIG. 3 is a block diagram showing the two-sensor, two-channel type anti-lock control system according to an embodiment of the present invention.
Figure 4:
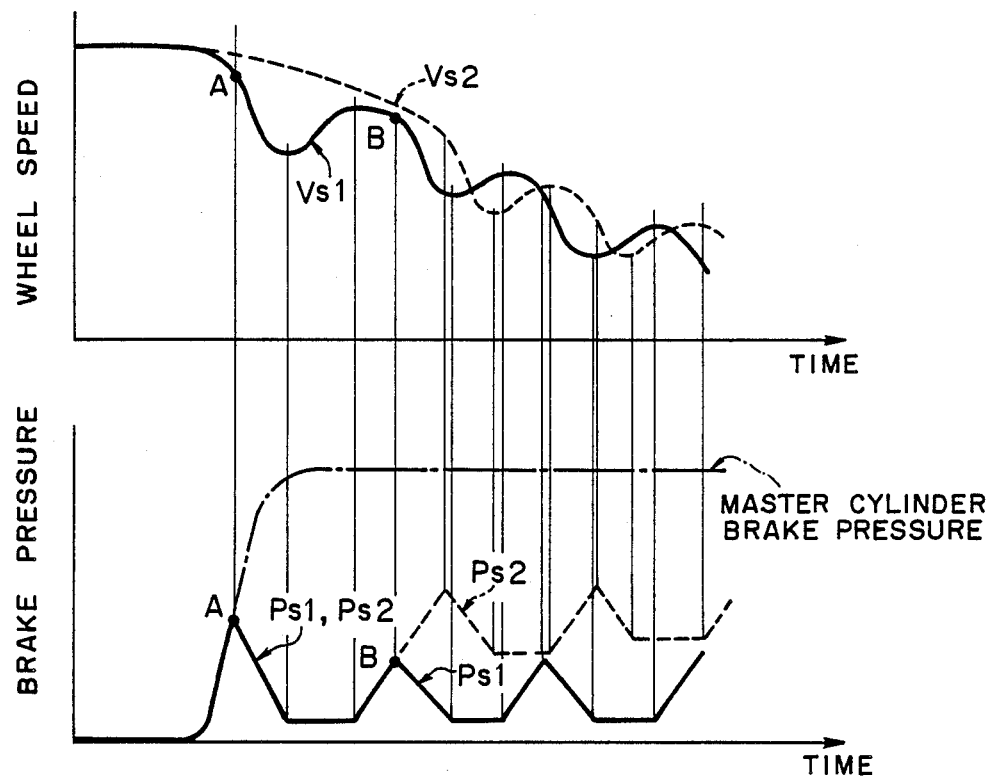
FIG. 4 is a view useful for explaining the relationship between the wheel speed and the brake oil pressure as occurs with the system of this invention.

Referring to FIG. 3, there is shown, in a block diagram, the antilock control system for two-sensor, two-channel type brake apparatus, which includes a righthand front wheel speed sensor 1 and lefthand front wheel speed sensor 2 which are arranged to freuqency signals f1 and f2 proportional to the revolutionary speeds of the righthand and lefthand front wheels respectively. These freuqency signals f1 and f2 are passed to arithmetic circuits 5 and 6 to be subjected to arithmetic operations so that signals representing the respective wheel speeds Vw1 and Vw2 are provided. Change-over switches S1 to S4 are arranged to interlock with each other. At a point of time when anti-lock control is started, these change-over switches S1 to S4 have their movable contacts at positions as indicated by solid lines in FIG. 3, so that the wheel speeds Vw1 and Vw2 are passed to a low-select circuit 12 in which the lower one of th righthand and lefthand front wheel speeds Vw1 and Vw2 is selected as the lower wheel speed Vw7 which in turn is passed to control logic circuits 13 and 14 by which hold valves HV and decay valves DV provided in modulators for the respective channels are onoff controlled. In this way, such anti-lock control as shown in Figure 4 is initiated with respect to the two channels at the same time and in the same manner. In this case, pressure reduction command signals which are provided from the control logic circuits 13 and 14 to the modulators ar also applied to the input terminals of an OR circuit 15 respectively. The OR circuit 15 has its output terminal connected to a counter 16 which is so designed as to provide an output to a switch drive circuit 17 when input pulse is counted twice, i.e., when the second cycle of the anti-lock control is started. In response to the output of the counter 16, the switch drive circuit 17 operates to change the contacts of the change-over switches S1 to S4 over to positions as indicated by broken lines in FIG. 3; as a result the respective wheel speeds Vw1 and Vw2 are imparted to the control logic circuits 13 and 14 as a first and a second channel speed Vs1 and Vs2 respectively; and in this way, two-channel anti-lock control wherein the respective channels are independently controlled, is started at the second cycle of the anti-lock control operation.

FIG. 4 illustrates the relationship between the lefthand and righthand front wheel speeds Vw1 and Vw2 and the brake oil pressures Ps1 and Ps2 in the two channels as anti-lock control is effected in accordance with the present invention. wherein at a point A, a first pressure reduction is started so that the first cycle of the anti-lock control is started; and at a point B, a second pressure reduction is started so that the second cycle of the anti-lock control is started. As will be appreciated from FIG. 4, the anti-lock control is effected with respect to the two channels at the same time and in the same manner from the point A to the point B, while from the point B onward, i.e., for the second and subsequent cycles of the anti-lock control, the two channels are controlled independently.

Figure 5:
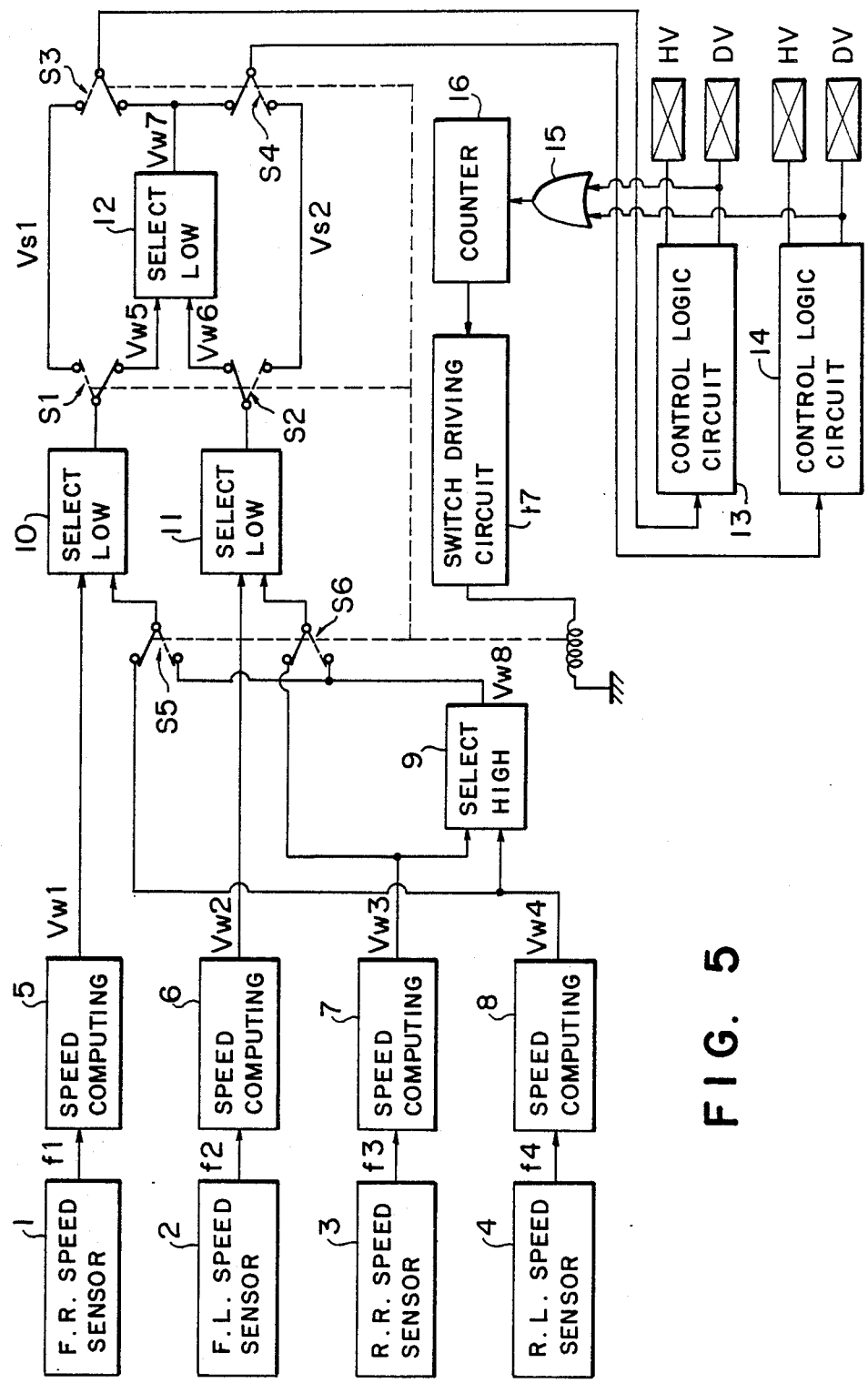
FIG. 5 is a block diagram showing the four-sensor, two-channel type anti-lock control system according to a second embodiment of this invention.

Referring to FIG. 5, there is shown, in a block diagram, the antilock control system for brake apparatus of the four-sensor, twochannel type, wherein wheel speed sensors 1 to 4 are provided in association with the four wheels of the motor vehicle respectively, whereby frequency signals f1 to f4 proportional to the respective wheel speeds are generated. The frequency signals f1 to f4 are passed to arithmetic circuits 5 to 8 respectively, from which are derived signals representing the wheel speeds Vw1 to Vw2.

Figure 1:
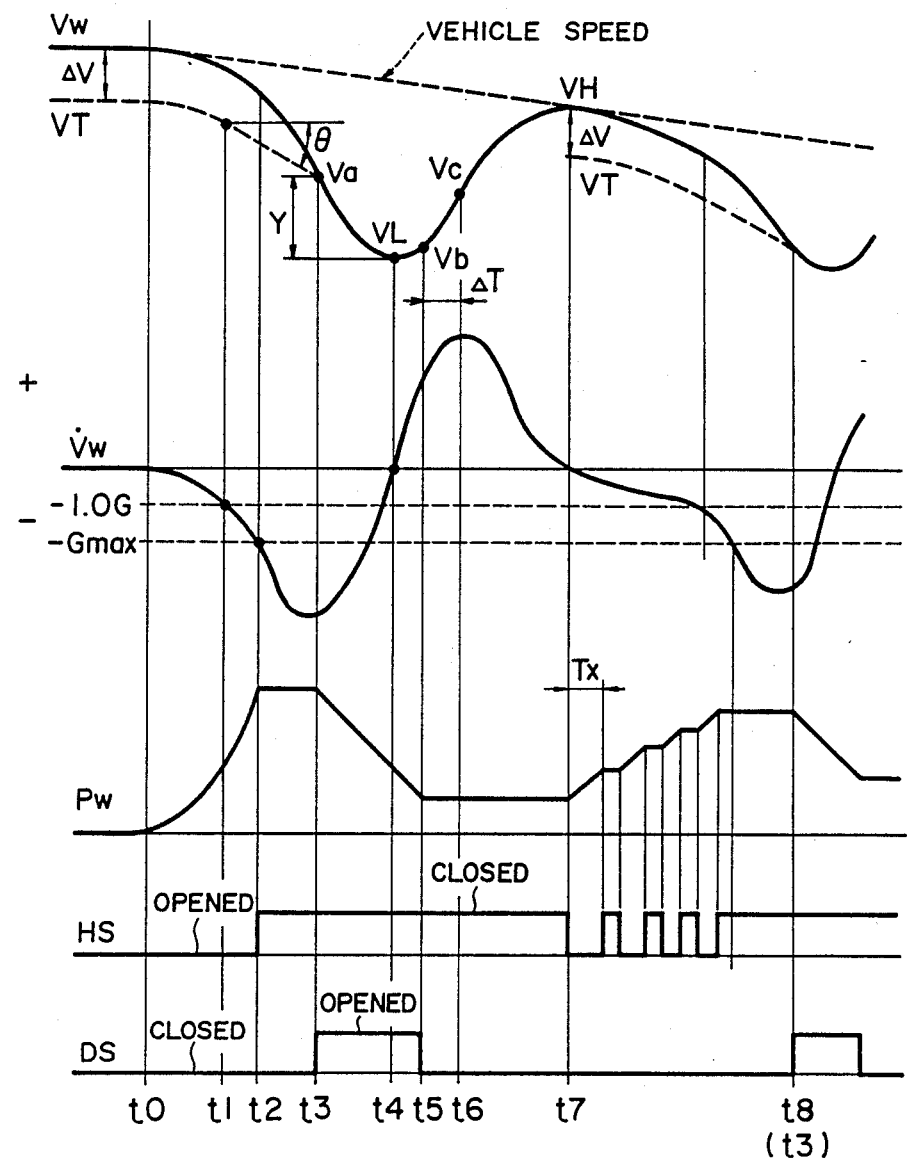
FIG. 1 is a view useful for xplaining how anti-lock control is effected with the prior-art anti-lock control system for motor vehicles.
Figure 2:
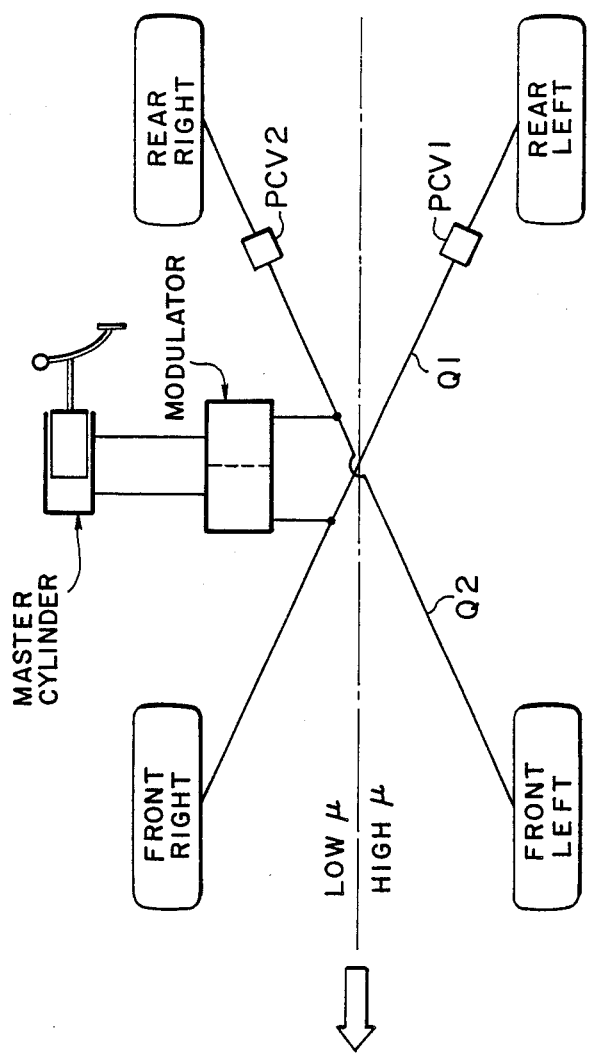
FIG. 2 is a schematic view showing conventional brake apparatus of the X-type piping arrangement.

Six change-over switches S1 to S6 are provided which are arranged to interlock with each other. At a point of time when anti-lock control is started, these change-over switches S1 to S6 have their movable contacts at positions as indicated by solid lines in FIG. 5, so that the righthand front wheel speed Vw1 and lefthand rear wheel speed Vw4 are passed to a low-select circuit 10 in which the lower one of these wheel speeds Vw1 and Vw4 is selected as the lower wheel speed Vw5. Similarly, the lefthand front wheel speed Vw2 and righthand rear wheel speed Vw3 are pased to a low-select circuit 11 in which the lower one of these wheel speeds is selected as the lower wheel speed Vw6. Subsequently, the wheel speeds Vw5 and Vw6 are passed to a low-select circuit 12 in which the lower one of these wheel speeds Vw5 and Vw6 is selected at the lower wheel speed Vw7 which in turn is passed to control logic circuits 13 and 14 by which hold valves HV and decay valves DV provided in modulators for the respective channels are on-off controlled. In this way, such anti-lock control as shown in FIG. 1 is initiated with respect to the two channels at the same time and in the same manner. The system shown in FIG. 5 also includes an OR circuit 15, counter 16, and switch drive circuit 17 which are similar to those provided in the system of FIG. 3. Upon initiation of the second cycle of the anti-lock control operation, the movable contacts of the change-over switches S1 to S6 are changed over to positions as indicated by broken lines in FIG. 5 so that the righthand rear wheel speed Vw3 and lefthand rear wheel speed Vw4 are passed to a select-high circuit 9 in which the higher one of these wheel speeds Vw3 and Vw4 is selected as a higher wheel speed Vw8 which in turn is passed, along with the righthand front wheel speed Vw1, to the low-select circuit 10 in which the lower one of these wheel speeds is selectd as a first channel speed Vs1 which in turn is passed to the control logic circuit 13. Further, the wheel speed Vw8 and the lefthand front wheel speed Vw2 are passed to the low-select circuit 11 in which the lower one of these wheel speeds is selected and passed as a second channel speed Vs2 to the control logic circuit 14. In this way, the respective channels are independently subjected to anti-lock control so that the second and subsequent cycles of the two-channel anti-lock control are effected.

While the present invention has been illustrated and described with respect to specific embodiments thereof, it is to be understood that the present invention is by no means limited thereto but encompasses all changes and modifications which will become possible within th scope of the appended claims.

I claim:

1. An anti-lock control system for a motor vehicle, comprising:
    a first arithmetic circuit for providing a signal representing right front wheel speed of the motor vehicle;
    a second arithmetic circuit for providing a signal representing left front wheel speed of the motor vehicle;
    a first control logic circuit arranged to provide pressure reduction and buildup command signals for enabling brake pressure for the right front wheel to be controlled by first brake pressure control means;
    a second control logic circuit arranged to provide brake pressure reduction and buildup command signals for enabling brake pressure for the left front wheel to be controlled by second brake pressure control means;
    a select circuit to which the signals provided by said first and second arithmetic circuits are inputted, said select circuit being arranged to select one of the input signals and provide an output signal;
    switch means having a first position for connecting the output signals of the first and second arithmetic circuits to the first and second control logic circuits respectively, and a second position for connecting the first and second control logic circuits to an output portion of said select circuit; and
    drive means for causing said switch means to be shifted to said second position only during the first cycle of anti-lock control from a point in time when a first pressure reduction command signal is provided by one of said first and second control logic circuits to a point in time which a second pressure reduction command signal is provided by said one of said first and second control logic circuits, to thereby minimize yawing moments immediately after start of braking.

2. The system according to claim 1, wherein said drive means is adapted to count the number of times that said first and second control logic circuits provide a pressure reduction command signal, said drive means being also adapted to cause said switch means to be shifted to said second position at a time point when the count thereof becomes equal to 2.

3. The system according to claim 1, wherein said select circuit is arranged to select the lower one of two input signals.

* * * * *